United States Patent Office 2,956,000
Patented Oct. 11, 1960

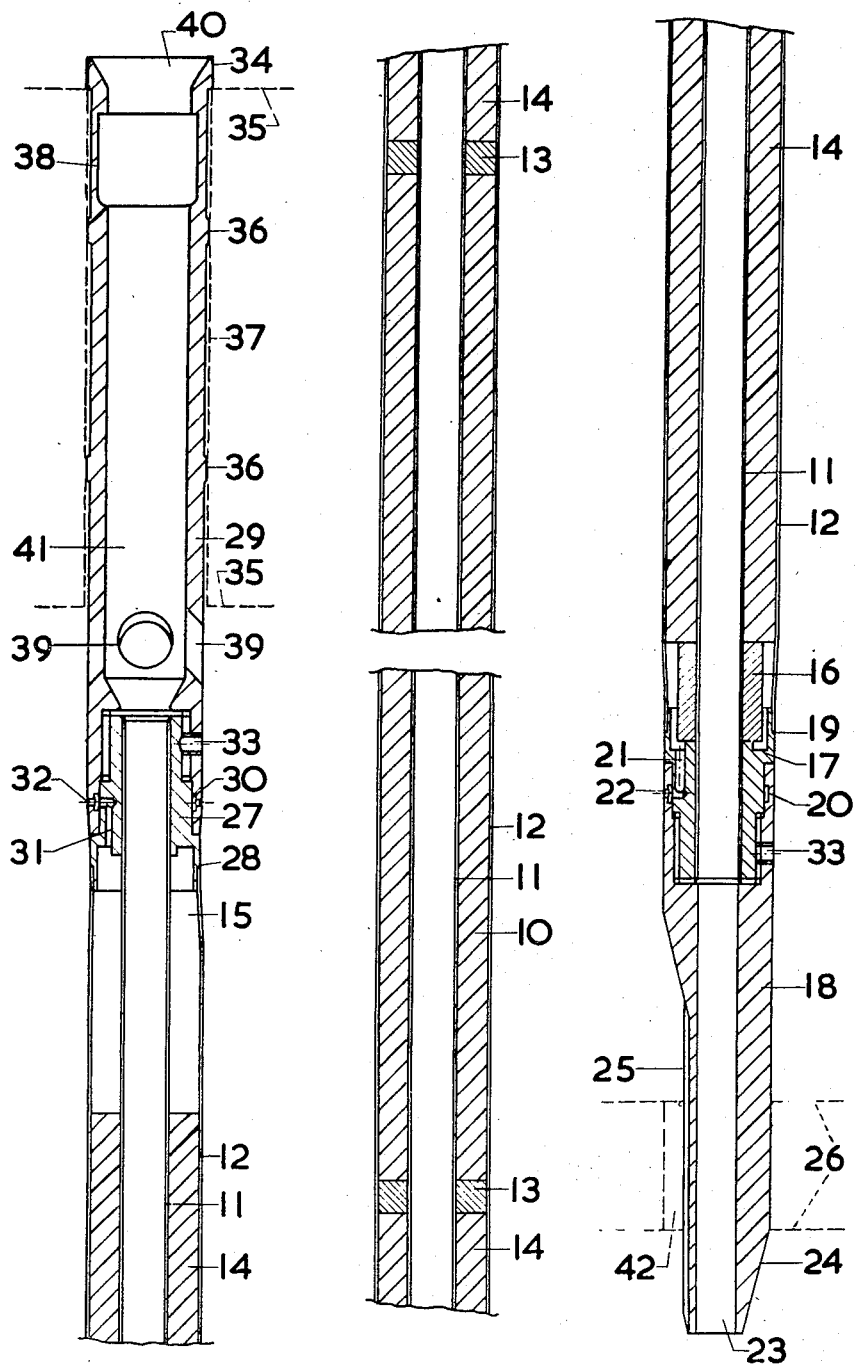

2,956,000

FUEL ELEMENTS FOR NUCLEAR REACTOR

James William Kendall, and Charles Ronald Tottle, Appleton, Warrington, England, assignors to United Kingdom Atomic Energy Authority, London, England Filed Apr. 30, 1956, Ser. No. 581,628

Claims priority, application Great Britain Apr. 30, 1955

12 Claims. (Cl. 204—193.2)

This invention relates to fuel elements for nuclear reactors and it is concerned with the type of fuel element having a highly enriched fuel content.

There is a danger in nuclear reactors using fuel elements having a highly enriched fuel content that the melting of some of the fuel elements may cause the build up of a supercritical mass so that a nuclear explosion takes place. Such a situation could arise for example by complete loss of coolant from the reactor core.

The present invention provides a fuel element adapted to fail under supernormal temperature conditions so that the fuel content discharges away from adjacent fuel elements to avoid formation of a super-critical mass.

According to the present invention a fuel element for a nuclear reactor has a fuel content of tubular form contained between inner and outer tubular sheaths, the inner sheath being formed of different material than that of the outer sheath so as to collapse at a lower temperature than the outer sheath to discharge under gravity at least some of the fuel content along the inside of the outer sheath when predetermined temperature conditions are exceeded in the element.

Three methods of providing that the inner sheath should collapse before the outer sheath are now referred to.

*Method 1.*—A material is used for the inner sheath which differs from that of the outer sheath and is selected so that on exceeding the predetermined temperature the fuel content and the inner sheath forms a molten alloy, after initial solid diffusion, whilst no reaction occurs with the outer sheath at or near that predetermined temperature. Examples embodying this method include one of the refractory metals tungsten, zirconium, molybdenum, titanium, tantalum, niobium as the outer sheath material and vanadium, chromium, nickel as the inner sheath material which form eutectics with uranium at about 1040° C., 860° C. and 750° C. respectively. As an alternative to pure metals for the inner sheath, one of the stainless steels, one of the 80/20 nickel-chromium high temperature creep resisting materials or two ply material which forms a suitable ternary eutectic with the fuel content may be used. A molybdenum/nickel two ply combination with a uranium fuel content gives a eutectic with the uranium at about 1000–1100° C. It is arranged that the molybdenum is adjacent to the uranium.

*Method 2.*—The inner sheath is made of a single material which melts at a suitable temperature or of a two ply material which forms a binary eutectic at a suitable temperature. The outer sheath is selected to retain its resistance as in Method 1 above. A suitable temperature for failure of the inner sheath is related to the nature of the outer sheath and the nature of the fuel content. To ensure that the outer sheath does not fail so rapidly that the fuel content does not have time to discharge along the outer sheath the failing temperature of the outer sheath requires to be more than 200° C. higher than that of the inner sheath. To ensure that the inner sheath does not fail without nearly immediate discharge of the fuel content the inner sheath failing temperature should be a temperature higher than 50° C. below the melting point of the fuel content. An example of Method 2 is a titanium/nickel or zirconium/nickel two ply inner sheath for a uranium fuel content with the titanium or zirconium adjacent to the uranium.

*Method 3.*—The inner sheath is made of a material which alloys with the fuel content at one temperature but is prevented from so doing until a higher temperature is reached by a barrier layer which inhibits solid diffusion. An example of this method is provided by a tantalum coated nickel tube, the tantalum coating providing a barrier layer 0.001″ thick. The outer sheath is again selected to retain its resistance as in Method 1 above.

A fuel element according to the invention and using Method 1 referred to above will now be described with reference to the accompanying drawings wherein Figs. 1A, 1B and 1C show, in section, the consecutive portions of the fuel element: Fig. 1A being the top end, Fig. 1B the centre portion, and Fig. 1C the bottom end.

The fuel element comprises enriched uranium fuel 10 (Fig. 1B) of tubular form, an inner vanadium sheath 11, and an outer sheath 12 of niobium. The fuel 10 is contained between two molybdenum washers 13. Above and below the washers 13 there are breeder tubes 14 of natural uranium. A free space 15 (Fig. 1A) exists above the upper tube 14. The lower tube 14 rests on a natural uranium packing tube 16 (Fig. 1C). The packing tube 16 is supported on a niobium end plug 17 which is threaded into a stainless steel bottom end fitting 18. The niobium sheath 12 is argon arc welded to the plug 17 at the line 19. The vanadium sheath 11 rests on the end fitting 18. An annulus 20, duct 21 and pluggable hole 22 are provided for filling the element with liquid sodium metal to improve heat transfer from the fuel to sheaths 11, 12. The end fitting 18 has a bore 23 equal to that of the sheath 11, a taper 24 and three symmetrically placed milled flats 25. A plate for locating the bottom end of the elements is shown by the dotted lines 26. A hole 42 in the plate is indicated.

At the top end of the fuel element there is a niobium end plug 27 (Fig. 1A) argon-arc welded to the sheath 12 along the line 28. The plug 27 is screw fitted in a stainless steel top end fitting 29. An annulus 30, duct 31 and open holes 32 are provided to allow for movement of the liquid sodium metal in to and out from the element. Threaded holes 33 are provided in both end fittings 18, 29 for a locking grub screw. The end fitting 29 is supported by a flanged end 34 resting on a top support plate (indicated by the dotted lines 35). Machined surfaces 36 locate the fitting 29 in a bore 37 in the top support plate 35. An undercut portion 38 provides means for inserting an extracting tool to withdraw the element from the top and bottom plates. Four holes 39 are provided for feeding coolant to the outside of the tube. Coolant enters the top end fitting 29 at a mouth 40 and divides at the end of a bore 41 in the fitting 29: one part of the coolant issues through the holes 39 and cools the sheath 12 and the other part passes down the sheath 11. At the bottom end of the element the coolant that sweeps the inner sheath 11 passes through the bore 23 and the coolant that sweeps the outer tube passes through the hole 42.

The fuel element is assembled by taking the outer sheath 12, spinning one end over to mate with the bottom plug 17 and then welding the sheath 12 to the plug 17 along the line 19. The outer sheath 12 is then filled with packing tube 16, breeder tubes 14, fuel tube 10 and molybdenum washers 13 in the correct order. The other end of the sheath 12 is spun over to mate with end plug 27 and then welded to that end plug. The inner tube 11 is fitted and the end fittings 18 and 29 screwed into place over the plugs 17 and 27 respectively. The element is purged with argon, then evacuated and sodium metal is introduced at the holes 22 which are sealed off after the filling operation has been completed. The holes 32 remain open.

With an external diameter of fuel of one inch and an internal diameter of 0.4" there is a diametral clearance in the cold condition of 0.020" between sheaths and fuel. The thickness of the sheaths 11, 12 is also 0.020".

The fuel element described above is designed for operation at a temperature of about 700° C. whilst being stable for periods of over-rating at 900° C. At between 1000 and 1100° C. there is a rapid breakdown (about 10 seconds) of the vanadium inner sheath which forms an alloy with the uranium content which is also near its melting point (1130° C.). The niobium outer sheath has been shown to be capable of withstanding temperatures up to 1300° C. in the presence of uranium for at least one hour.

The materials used in the construction of the fuel element, namely, uranium, niobium, vanadium, molybdenum and stainless steel are all compatible with liquid sodium metal or sodium-potassium eutectic which may be used as coolants and as a filling material in the element to assist heat transfer.

Should temperature conditions in the fuel elements described above be such as to cause the inner sheath 11 to fail the fuel is discharged by gravitational forces along the inner wall of the outer sheath thereby ensuring that the fuel leaves the core and the neutron conserving influence of the reflector of the reactor. This in itself is probably adequate to avoid the creation of supercritical conditions but as an added safeguard the discharged fuel is scattered into a geometric shape unfavourable to fostering supercriticality such as the shape of a ring at the base of a conical deflector or as a "pancake" over a flat surface.

We claim:

1. A fuel element for a nuclear reactor having a fuel content of tubular form contained between inner and outer tubular sheaths, the inner sheath being formed of a different material from that of the outer sheath so as to collapse at a lower temperature than the outer sheath to discharge under gravity at least some of the fuel content along the inside of the outer sheath when predetermined temperature conditions are exceeded in the element.

2. A fuel element according to claim 1 in which the inner sheath is formed of material selected so that on exceeding the predetermined temperature conditions the fuel content and the inner sheath, after mutual solid diffusion, form a molten alloy.

3. A fuel element according to claim 1 in which the inner sheath is formed of two ply material selected so that on exceeding the predetermined temperature the fuel content and the inner sheath, after mutual solid diffusion, form a molten ternary alloy.

4. A fuel element according to claim 1 in which the inner sheath is formed of two ply material, the two ply forming a binary eutectic melting at a temperature higher than 50° C. below the melting point of the fissile content and more than 200° C. below the melting point of the outer sheath.

5. A fuel element according to claim 1 in which the inner sheath is formed of a single material which melts at a temperature higher than 50° C. below the melting point of the fissile content and more than 200° C. below the melting point of the outer sheath.

6. A fuel element according to claim 1 in which the inner sheath is formed of material which forms a molten alloy with the fuel content at one temperature and has a barrier layer of material which inhibits mutual solid diffusion of inner sheath and fuel content until a predetermined higher temperature is reached.

7. A fuel element according to claim 5 in which the fuel content is uranium and the inner sheath is formed of one of the group consisting of vanadium, chromium, nickel, stainless steel and 80/20 nickel-chromium high temperature alloy.

8. A fuel element according to claim 3 in which the fuel content is uranium and the inner sheath is formed of a molybdenum-nickel two ply combination of material with the molybdenum adjacent to the uranium.

9. A fuel element according to claim 4 in which the fuel content is uranium and the inner sheath is formed of a titanium-nickel two-ply combination of material with the titanium adjacent to the uranium.

10. A fuel element according to claim 7 in which the outer sheath is formed of one of the group consisting of tungsten, zirconium, molybdenum, titanium, tantalum, niobium.

11. A fuel element for a nuclear reactor having an enriched uranium fuel content in tubular form contained between an inner vanadium sheath and an outer niobium sheath.

12. A fuel element according to claim 4 in which the fuel content is uranium and the inner sheath is formed of a zirconium nickel two-ply combination of material with the zirconium adjacent to the uranium.

References Cited in the file of this patent

UNITED STATES PATENTS 2,698,913    Espersen    Jan. 4, 1955
2,750,527    Katz    June 12, 1956

OTHER REFERENCES

Ohlinger: Nucleonics, February 1950, page 59.

Kruzhilin: International Conference on the Peaceful Uses of Atomic Energy, United Nations, vol II (1956), page 444.

The Sylvania Technologist, January 1956, vol. IX, No. 1, pages 2–6.